US008917692B2

(12) United States Patent
Seo et al.

(10) Patent No.: US 8,917,692 B2
(45) Date of Patent: Dec. 23, 2014

(54) METHOD AND APPARATUS FOR PREVENTING INTER-CELL INTERFERENCE IN A HETEROGENEOUS NETWORK SYSTEM

(75) Inventors: Inkwon Seo, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 131 days.

(21) Appl. No.: 13/820,732

(22) PCT Filed: Sep. 5, 2011

(86) PCT No.: PCT/KR2011/006553
§ 371 (c)(1),
(2), (4) Date: Mar. 4, 2013

(87) PCT Pub. No.: WO2012/046956
PCT Pub. Date: Apr. 12, 2012

(65) Prior Publication Data
US 2013/0155999 A1     Jun. 20, 2013

Related U.S. Application Data

(60) Provisional application No. 61/391,575, filed on Oct. 8, 2010.

(51) Int. Cl.
*H04W 4/00* (2009.01)
*H04W 72/08* (2009.01)
(Continued)

(52) U.S. Cl.
CPC ........... *H04W 72/082* (2013.01); *H04L 1/1896* (2013.01); *H04L 5/001* (2013.01);
(Continued)

(58) Field of Classification Search
None
See application file for complete search history.

(56) References Cited

U.S. PATENT DOCUMENTS

2012/0051277 A1*   3/2012   Li et al. .......................... 370/312
2012/0082126 A1*   4/2012   Kim et al. ..................... 370/329
(Continued)

FOREIGN PATENT DOCUMENTS

KR    1020090121368    11/2009
KR    1020090125289    12/2009
(Continued)

OTHER PUBLICATIONS

3GPP TSG-RAN WG1#63, Discussion on 1st ABS pattern bitmap for TDD, Nov. 5-19, 2010, R1-106315, pp. 1-8.*
(Continued)

*Primary Examiner* — Kouroush Mohebbi
(74) *Attorney, Agent, or Firm* — Lee, Hong, Degerman, Kang & Waimey

(57) ABSTRACT

The present application relates to a method for a victim cell to construct a subframe alignment in a wireless communication system. More particularly, the method comprises the following steps: receiving, from an interfering cell, subframe alignment information including a first bitmap for defining a subframe pattern for the victim cell and a second bitmap for defining a hybrid automatic repeat and request (HARQ) process pattern of the victim cell; constructing a subframe alignment of the victim cell on the basis of the first bitmap and second bitmap; and performing scheduling for a terminal in the victim cell using the constructed subframe alignment. A downlink signal of the interfering cell may not be transmitted in one or more subframes designated by the subframe pattern for the victim cell, and the second bitmap has a size of 8 bits.

15 Claims, 16 Drawing Sheets

(a)

(b)

(51) Int. Cl.
  *H04L 1/18* (2006.01)
  *H04L 5/00* (2006.01)
  *H04W 72/12* (2009.01)
  *H04L 1/00* (2006.01)

(52) U.S. Cl.
  CPC ........... *H04L 5/0035* (2013.01); *H04L 5/0055* (2013.01); *H04L 5/0057* (2013.01); *H04L 5/0066* (2013.01); *H04L 5/0073* (2013.01); *H04L 1/1822* (2013.01); *H04W 72/1226* (2013.01); *H04L 1/1812* (2013.01); *H04L 5/0023* (2013.01); *H04L 5/0048* (2013.01); *H04L 5/0053* (2013.01); *H04L 5/0094* (2013.01); *H04L 2001/0097* (2013.01)
  USPC ........................................................ 370/329

(56) References Cited

U.S. PATENT DOCUMENTS

2012/0113843 A1* 5/2012 Watfa et al. ................... 370/252
2013/0077543 A1* 3/2013 Kim et al. ..................... 370/281
2013/0286906 A1* 10/2013 Seo et al. ...................... 370/280

FOREIGN PATENT DOCUMENTS

KR   1020100072146   6/2010
KR   1020100085181   7/2010

OTHER PUBLICATIONS

3GPP TSG-RAN WG1#63, Details of eICIC in Macro-Pico case, Nov. 15-19, 2010, R1-106143, pp. 1-2.*

3GPP TSG-RAN WG1#63, ABS signaling consideration for LTE-A TDD, Nov. 15-19, 2010, R1-105940, pp. 1-4.*

TSG-RAN WG1 Meeting #62bis, Way Forward on time-domain extension of Rel 8/9 backhaul-based ICIC, Xi'an, P. R. China, Oct. 11-15, 2010, R1-105779, pp. 1-4.*

PCT International Application No. PCT/KR2011/006553 Written Opinion of the International Searching Authority dated Apr. 23, 2012, 9 pages.

PCT International Application No. PCT/KR2011/006553 Written Opinion of the International Searching Authority dated Apr. 23, 2012, 16 pages.

* cited by examiner

FIG. 2
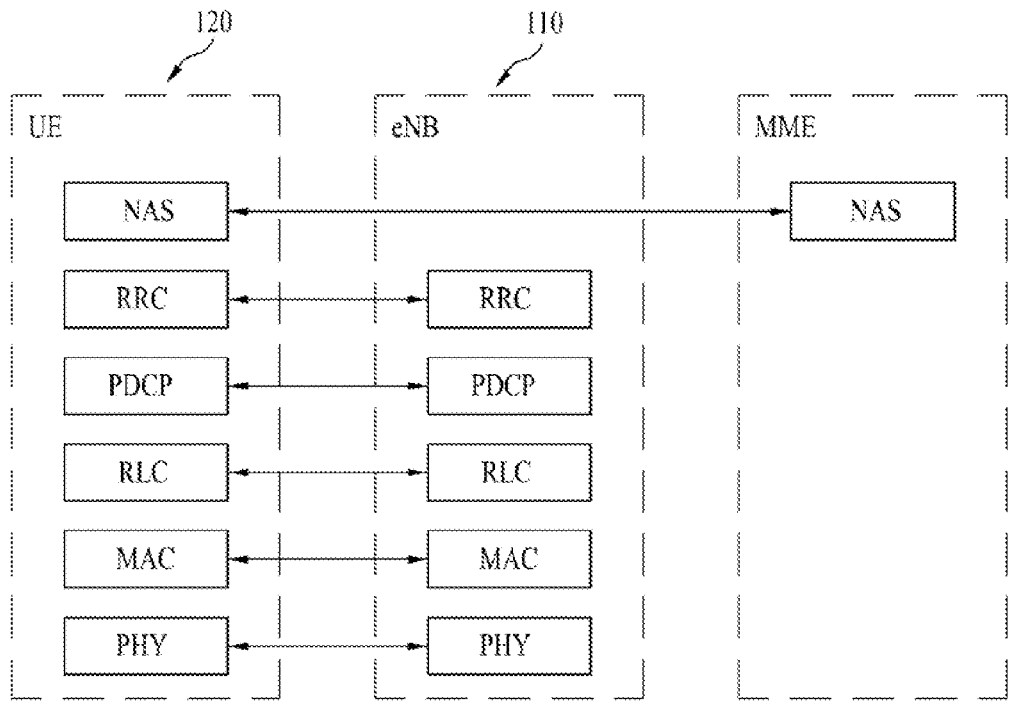
(a) control plane protocol stack
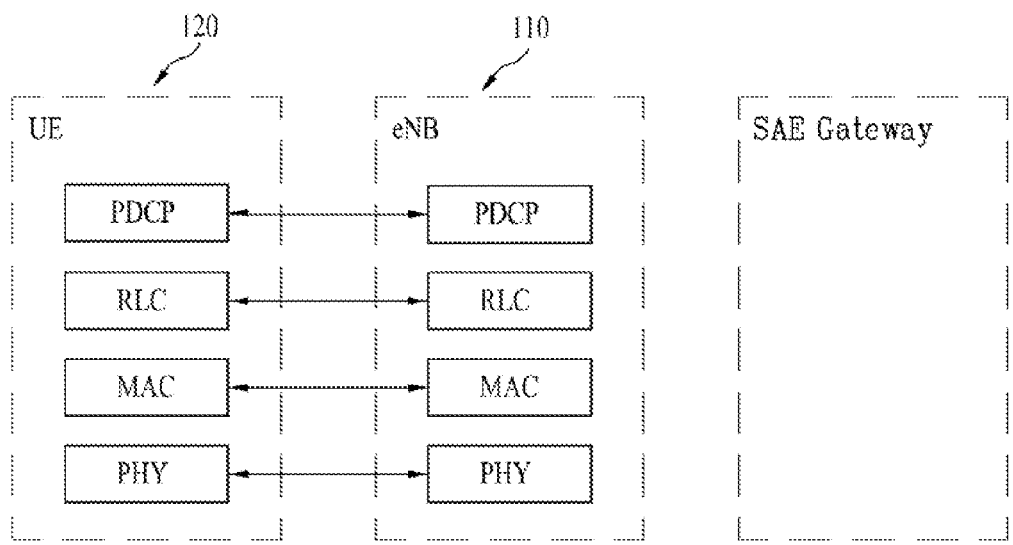
(b) user plane protocol stack

FIG. 15

| 1 | 0 | 0 | 0 | 0 | 0 | 0 | 0 | 0 |  subframe offset = 0
| 0 | 1 | 0 | 0 | 0 | 0 | 0 | 0 | 0 |  subframe offset = 1
| 0 | 0 | 1 | 0 | 0 | 0 | 0 | 0 | 0 |  subframe offset = 2

⋮

| 0 | 0 | 0 | 0 | 0 | 0 | 0 | 1 | 0 |  subframe offset = 8
| 0 | 0 | 0 | 0 | 0 | 0 | 0 | 0 | 1 |  subframe offset = 9

METHOD AND APPARATUS FOR PREVENTING INTER-CELL INTERFERENCE IN A HETEROGENEOUS NETWORK SYSTEM

CROSS-REFERENCE TO RELATED APPLICATIONS

This application is the National Stage filing under 35 U.S.C. 371 of International Application No. PCT/KR2011/006553, filed on Sep. 5, 2011, which claims the benefit of U.S. Provisional Application Ser. No. 61/391,575, filed on Oct. 8, 2010, the contents of which are all hereby incorporated by reference herein in their entirety.

TECHNICAL FIELD

The present invention relates to a wireless communication system, and more particularly, to a method of preventing an inter-cell interference in a heterogeneous network system and apparatus therefor.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of preventing an inter-cell interference in a heterogeneous network system and apparatus therefor in the following description based on the discussion as mentioned in the foregoing description.

Technical Solution

To achieve these and other advantages and in accordance with the purpose of the present invention, as embodied and broadly described, according to one embodiment of the present invention a method of configuring a subframe arrangement, which is configured by an interfered cell in a wireless communication system includes the steps of receiving a subframe arrangement information including a first bitmap for defining a subframe pattern for the interfered cell and a second bitmap for defining an HARQ (hybrid automatic repeat and request) process pattern of the interfered cell from an interfering cell, configuring the subframe arrangement of the interfered cell based on the first bitmap and the second bitmap, and performing a scheduling for a user equipment belonging to the interfered cell using the configured subframe arrangement, wherein a downlink signal of the interfering cell is not transmitted in one or more subframes designated by the subframe pattern for the interfered cell, wherein a size of the second bitmap is 8 bits and wherein the subframe arrangement information is received via an X2 interface.

Preferably, the downlink signal is transmitted to the user equipment belonging to the interfered cell in one or more subframes designated by the subframe arrangement.

More preferably, the subframe arrangement of the interfered cell configuring step includes the steps of repeating each of the first bitmap and the second bitmap with a size of a least common multiple of the size of the first bitmap and the second bitmap and generating the subframe arrangement of the interfered cell by performing an OR calculation by a bitwise on the repeated first bitmap and the repeated second bitmap, wherein the size of the first bitmap is 10 bits.

Preferably, the method further includes the step of receiving an interfering cell-specific subframe information from the interfering cell, wherein the subframes defined by the first bitmap excludes one or more subframes designated by the interfering cell-specific subframe information. In this case, the subframe arrangement of the interfered cell configuring step includes the steps of configuring a third bitmap by adding one or more subframe informations designated by the interfering cell-specific subframe information to the first bitmap, repeating each of the second bitmap and the third bitmap with a size of a least common multiple of the size of the second bitmap and the third bitmap, and generating the subframe arrangement of the interfered cell by performing an OR calculation by a bitwise on the repeated second bitmap and the repeated third bitmap, wherein the size of the third bitmap is 10 bits.

Preferably, the interfered cell is a pico cell and the user equipment belonging to the interfered cell is situated at a region of an expanded range of the pico cell.

To further achieve these and other advantages and in accordance with the purpose of the present invention, according to another embodiment of the present invention a base station device in a wireless communication system includes a receiving module configured to receive a subframe arrange information including a first bitmap for defining a subframe pattern for the base station device and a second bitmap for defining an HARQ (hybrid automatic repeat and request) process pattern of the base station device from an adjacent base station, a processor configured to configure the subframe arrangement of the interfered cell based on the first bitmap and the second bitmap, and a transmitting module configured to transmit a downlink signal to a user equipment belonging to the base station device in one or more subframes designated by the subframe arrangement, wherein a downlink signal of the adjacent base station is not transmitted in one or more subframes designated by the subframe pattern for the base station device, wherein a size of the second bitmap is 8 bits, and wherein the size of the first bitmap is 10 bits.

Preferably, the processor repeats each of the first bitmap and the second bitmap with a size of a least common multiple of the size of the first bitmap and the second bitmap and generates the subframe arrangement of the base station device by performing an OR calculation by a bitwise on the repeated first bitmap and the repeated second bitmap.

Preferably, the receiving module further receives an adjacent base station-specific subframe information from the adjacent base station and the subframes defined by the first bitmap excludes one or more subframes designated by the adjacent base station-specific subframe information.

More preferably, the processor configures a third bitmap by adding one or more subframe informations designated by the adjacent base station-specific subframe information to the first bitmap, repeats each of the second bitmap and the third bitmap with a size of a least common multiple of the size of the second bitmap and the third bitmap, and generates the subframe arrangement of the base station device by performing an OR calculation by a bitwise on the repeated second bitmap and the repeated third bitmap, wherein the size of the third bitmap is 10 bits.

It is to be understood that both the foregoing general description and the following detailed description are exemplary and explanatory and are intended to provide further explanation of the invention as claimed.

Advantageous Effects

According to embodiments of the present invention, a signaling overhead for preventing an inter-cell interference in a heterogeneous network system may be effectively reduced.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram for structures of control and user planes of radio interface protocol between a 3GPP radio access network standard-based user equipment and E-UTRAN;

FIG. 15 is another diagram for showing one example of configuring a subframe pattern according to a $2^{nd}$ embodiment of the present invention;

BEST MODE

Mode for Information

Figure 1:
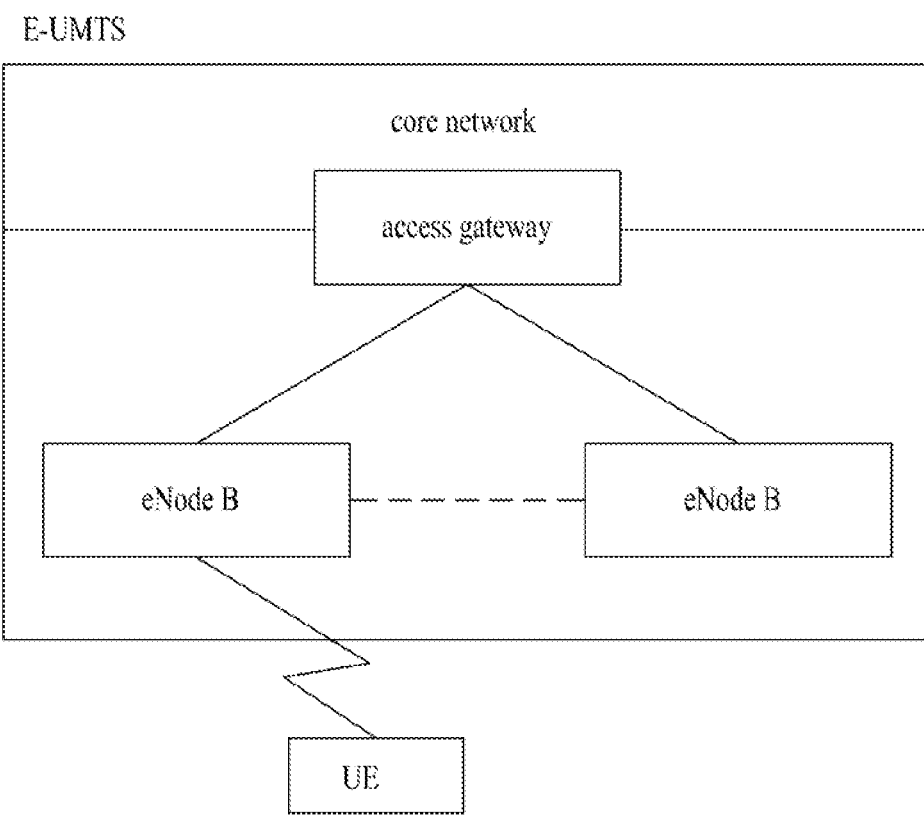
FIG. 1 is a schematic diagram of E-UMTS network structure as one example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1$^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2$^{nd}$ layer provides a service to a radio link control (hereinafter abbreviated RLC) layer, which is a higher layer, on a logical channel. The RLC layer of the 2$^{nd}$ layer supports a reliable data transmission. The function of the RLC layer may be implemented by a function block within the MAC. PDCP (packet data convergence protocol) layer of the 2$^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3$^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2$^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
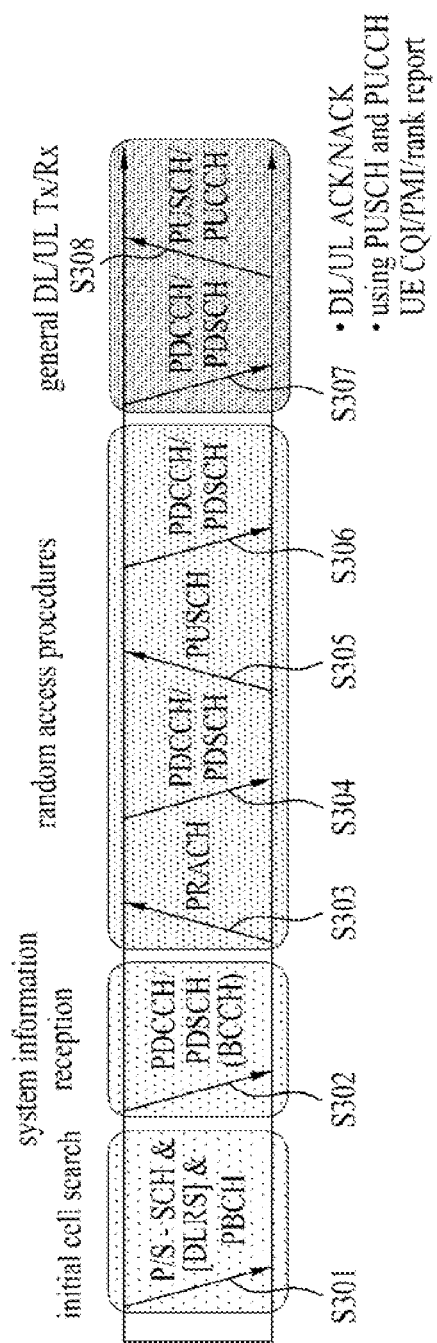
FIG. 3 is a diagram for explaining physical channels used for 3GPP system and a general signal transmission method using the physical channels.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the base station [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
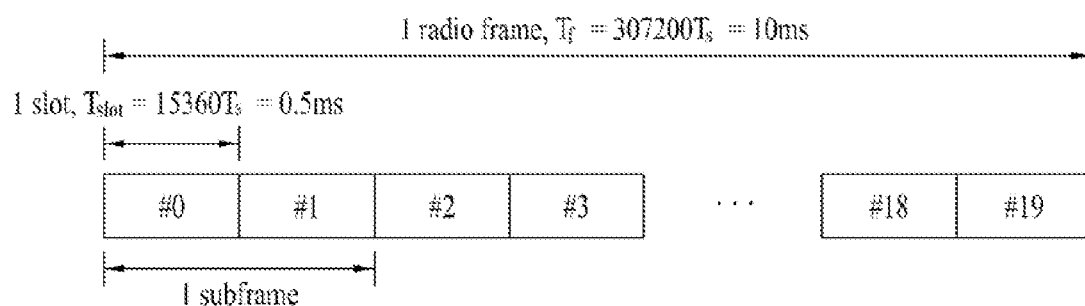
FIG. 4 is a diagram for a structure of a radio frame in LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15 \text{ kHz} \times 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
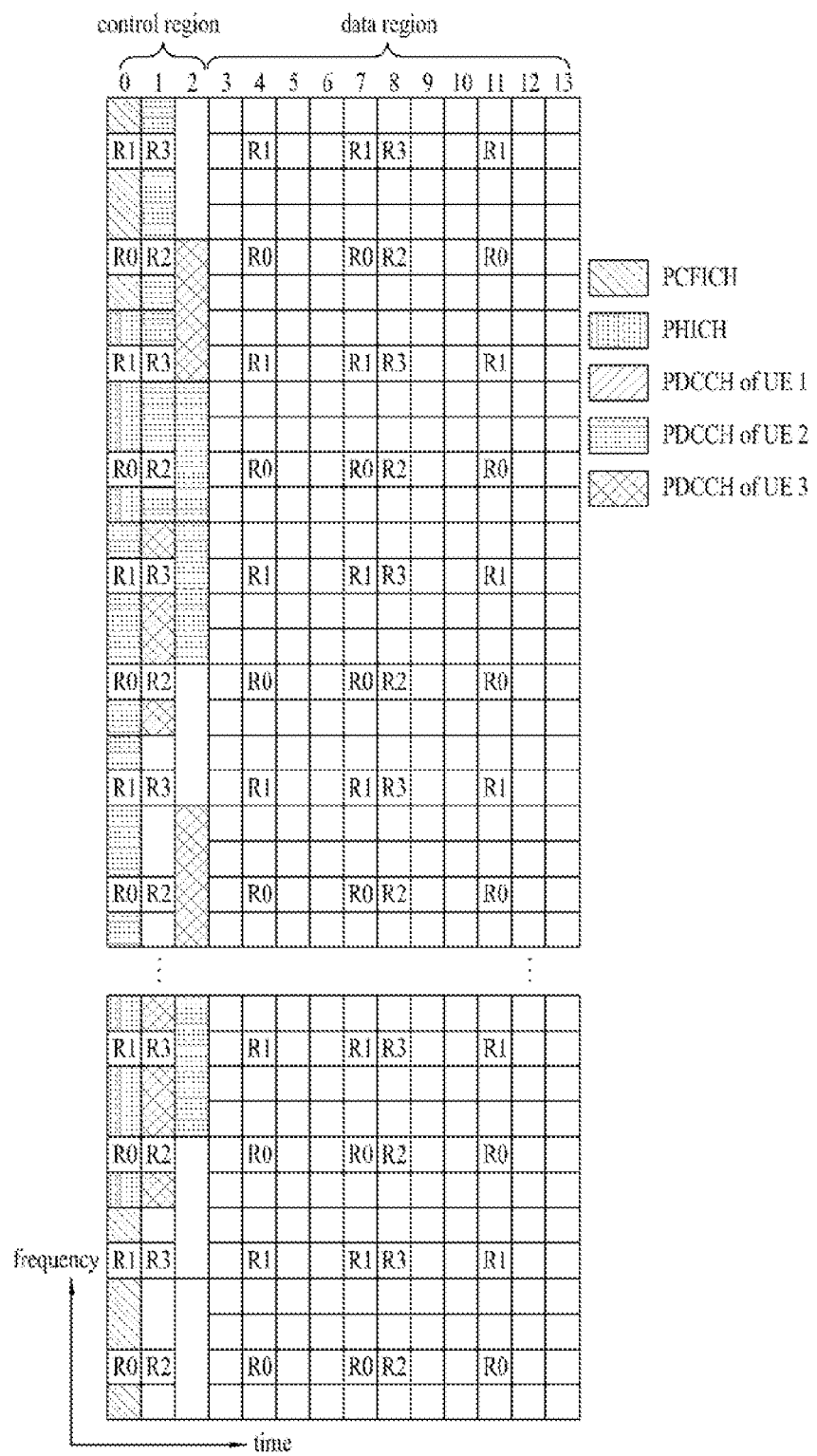
FIG. 5 is a diagram for a structure of a downlink radio frame in LTE system.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier*one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, a base station and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 6:
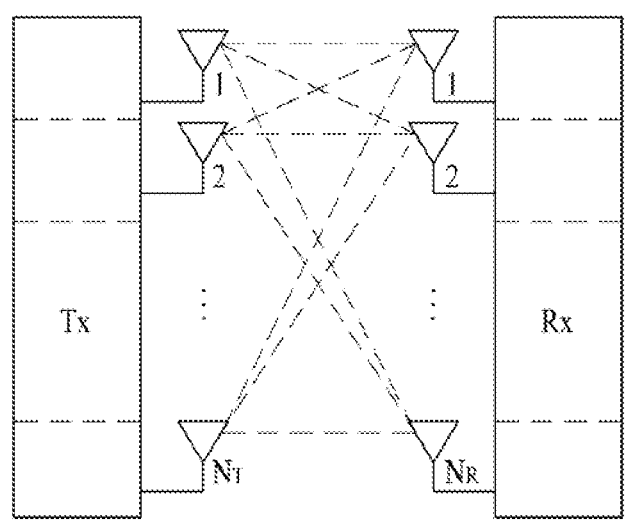
FIG. 6 is a block diagram of a general multi-antenna (MIMO) communication system.

A block diagram of a general multi-antenna communication system is depicted in FIG. 6. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$ as shown in the following Formula 1. In this case, the $R_i$ is a smaller value of the $N_T$ and the $N_R$.

$$R_i = \min(N_T, N_R) \quad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 6, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \qquad \text{[Formula 2]}$$

Meanwhile, for each of the transmission informations $s_1, s_2, \ldots, s_{N_T}$, a transmit power may be differentiated according to the each of the transmission) informations. In this case, if each of the transmit powers is represented as $P_1, P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, if $\hat{s}$ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The W is called the weighted matrix or a precoding matrix.

$$x = \begin{bmatrix} x_1 \\ x_2 \\ \vdots \\ x_i \\ \vdots \\ x_{N_T} \end{bmatrix} \qquad \text{[Formula 5]}$$

-continued
$$= \begin{bmatrix} w_{11} & w_{12} & \cdots & w_{1N_T} \\ w_{12} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$
$$= W\hat{s}$$
$$= WPs$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \qquad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \qquad \text{[Formula 7]}$$

In this case, '# of streams' indicates the number of streams. Meanwhile, in this case, it should be cautious that one stream can be transmitted via more than one antenna.

Various methods may exist to make one or more streams correspond to many antennas. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following description, a reference signal is explained in detail. In general, the reference signal, which is already known to a transmitting side and a receiving side, is transmitted from the transmitting side to the receiving side together with data for channel measurement. In addition to the channel measurement, the reference signal performs a role of making a demodulation process to be performed in a manner of informing a modulation scheme. The reference signal is classified into a dedicated reference signal (DRS) for a base station and specific user equipment, i.e., a user equipment-specific reference signal and a common reference signal (CRS) for all user equipments in a cell, i.e., a cell-specific reference signal. And, the cell-specific reference signal includes a reference signal to report CQI/PMI/RI measured by the user equipment to the base station and the reference signal is called a CSI-RS (channel state information-RS).

Figure 7:
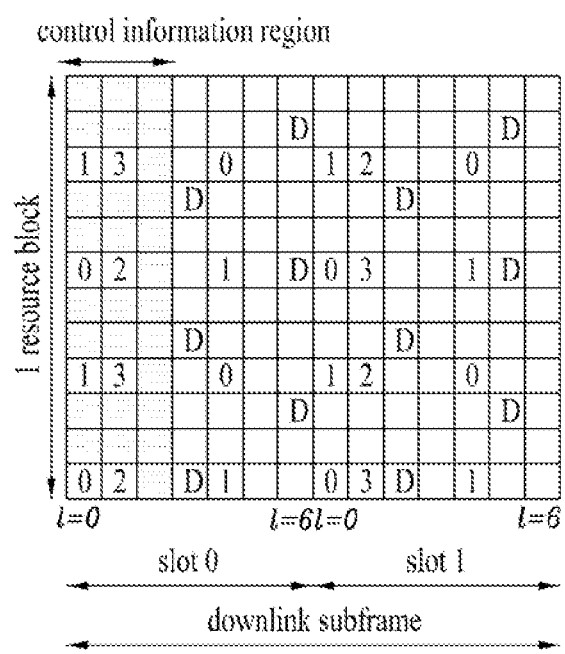
FIG. 7 and FIG. 8 are diagrams of a structure of a reference signal in LTE system supportive of downlink transmission using 4 antennas.
Figure 8:
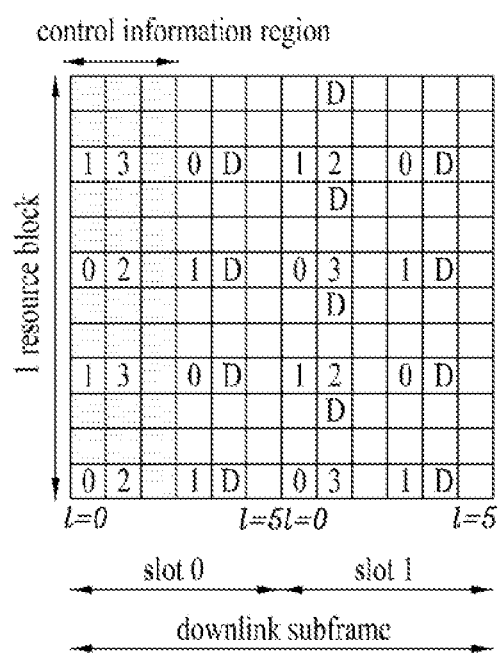

FIG. 7 and FIG. 8 are diagrams of a structure of a reference signal in LTE system supportive of downlink transmission using 4 antennas. In particular, FIG. 7 shows a case of a normal cyclic prefix and FIG. 8 shows a case of an extended cyclic prefix.

Referring to FIG. 7 and FIG. 8, 0 to 3 written in a grid may mean the CRS (common reference signal), which is a cell-specific reference signal, transmitted for the channel measurement and the data demodulation in a manner of corresponding to antenna port 0 to 3, respectively. The cell-specific reference signal CRS can be transmitted to a user equipment via the control information region as well as the data information region.

And, 'D' written on the grid may mean a downlink DM-RS (demodulation RS), which is a user-specific RS. The DM-RS supports a single antenna port transmission via the data region, i.e., the PDSCH. The user equipment is signaled whether the DM-RS, which is the user equipment-specific RS, exists or not via an upper layer. FIG. 7 and FIG. 8 show an example of the DM-RS corresponding to an antenna port 5. The DM-RS corresponding to an antenna port 7 to 14 is also defined by 3GPP standard document 36.211.

Meanwhile, a mapping rule of a reference signal as a resource block (RB) can be represented as Formula 8 to Formula 10 as follows. The following Formula 8 is a formula for indicating a CRS mapping rule. And, Formula 9 is a formula for indicating a DRS mapping rule to which a normal CP applies and Formula 10 is a formula for indicating a DRS mapping rule to which an extended CP applies.

$$k = 6m + (v + v_{shift}) \bmod 6 \quad \text{[Formula 8]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

$$k = (k') \bmod N_{sc}^{RB} + N_{sc}^{RB} \cdot n_{PRB} \quad \text{[Formula 9]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

-continued $$k = (k') \bmod N_{sc}^{RB} + N_{sc}^{RB} \cdot n_{PRB} \quad \text{[Formula 10]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 1, 2 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Formula 8 to Formula 10, k and p indicate a subcarrier index and an antenna port, respectively. $N_{RB}^{DL}$, $n_s$, and $N_{cell}^{ID}$ indicate the number of RBs allocated to a downlink, the number of slot index, and the number of cell ID, respectively. A position of the RS varies according to a value of $V_{shift}$ in the frequency domain point of view.

Meanwhile, it is expected that a LTE-A system, which is a standard of a next generation mobile communication system, will support a CoMP (coordinated multi point) transmission method, which is not supported by the conventional standard, to enhance a data transmission rate. In this case, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (COMP jointprocessing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in case of a DL, a user equipment may be able to instantaneously receive data simultaneously from each of the base stations performing the CoMP transmission method. And, a reception performance can be enhanced in a manner of combining the signals received from each of the base stations. On the other hand, according to the coordinated scheduling/beamforming method (CoMP-CS/CB), the user equipment may be able to instantaneously receive data from a single base station via a beamforming.

According to the joint processing (CoMP-JP) method in case of an UL, each of the base stations may be able to simultaneously receive PUSCH signal from the user equipment. On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

Meanwhile, In case that a channel status between a base station and a user equipment is poor, a relay node (RN) is installed between the base station and the user equipment, thereby providing the user equipment with a radio channel having a better channel status. Moreover, by introducing a relay node into a cell edge area having a poor channel status from a base station, if the relay node is used, it may provide a faster data channel and extend a cell service area. Thus, a relay node is the technology introduced to solve the propagation shadow zone problem of a wireless communication system and is widely used.

Compared to a conventional relay node having a function limited to a function of a repeater configured to simply amplify and transmit a signal, a recent relay node is evolved into a further-intelligent form. Moreover, the relay node technology corresponds to the technology essential to service coverage extension and data throughput improvement as well as cost reductions for base station expansion and backhaul network maintenance in a next generation mobile communication system. To keep up with the ongoing development of the relay node technology, it is necessary for a new wireless communication system to support a relay node used by the related art wireless communication system.

In 3GPP LTE-A ($3^{rd}$ Generation Partnership Project Long Term Evolution-Advanced) system, as a relay node is introduced to play a role of forwarding a linkage between a base station and a user equipment, links of two types differing from each other in attribute are applied to a UL carrier frequency band and a DL carrier frequency band, respectively. A connecting link part established between a base station and a relay node is represented in a manner of being defined as a backhaul link. If transmission is performed by FDD (frequency division duplex)) or TDD (time division duplex) using a DL resource, it may be represented as a backhaul downlink. If transmission is performed by FDD or TDD using a UL resource, it may be represented as a backhaul uplink.

Figure 9:
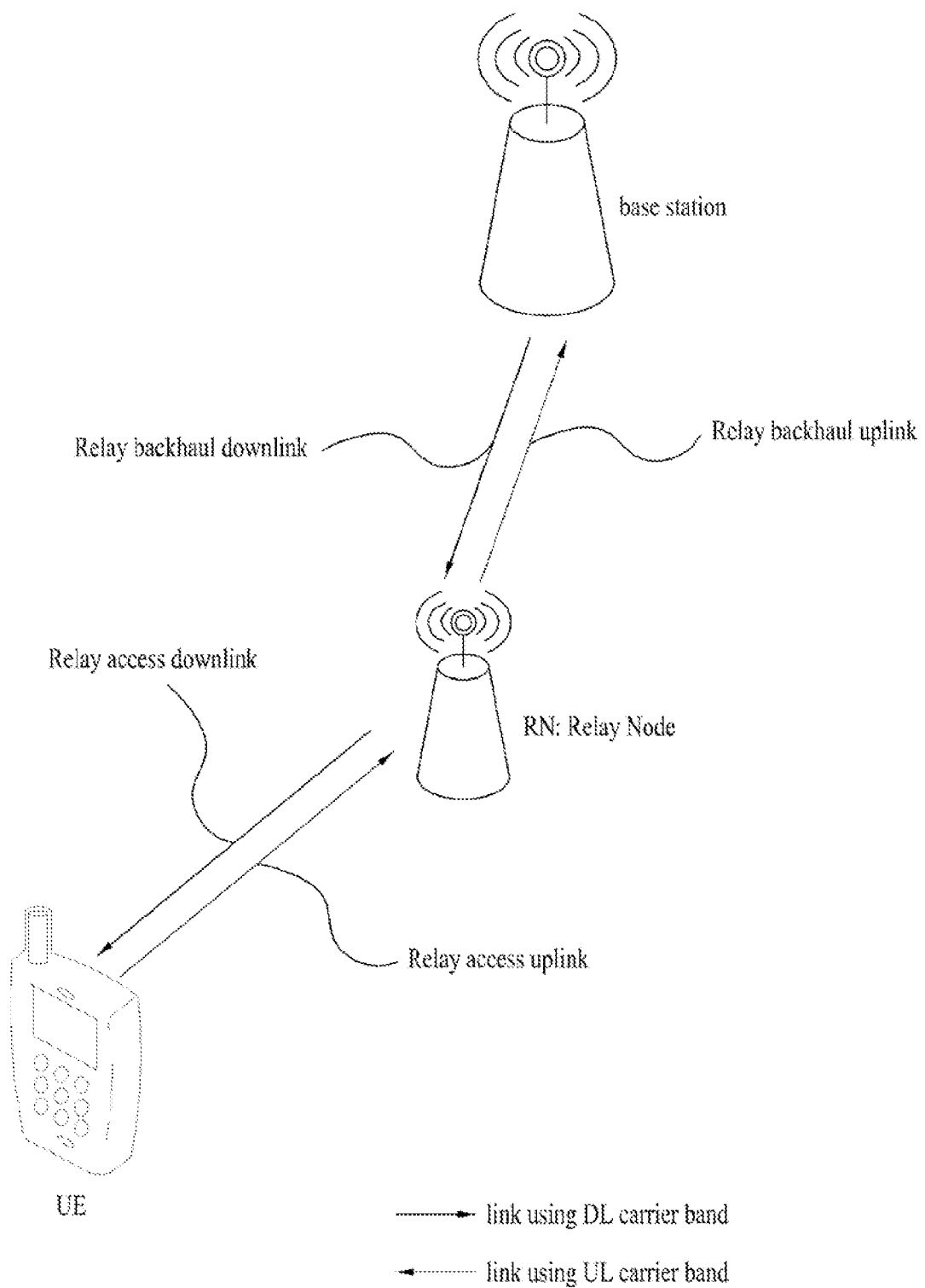
FIG. 9 is a diagram for showing a configuration of a relay backhaul link and a relay access link in a wireless communication system.

FIG. 9 is a diagram for showing a configuration of a relay backhaul link and a relay access link in a wireless communication system.

Referring to FIG. 9, as a relay node is introduced to play a role of forwarding a linkage between a base station and a user equipment, links of two types differing from each other in attribute are applied to a UL carrier frequency band and a DL carrier frequency band, respectively. A connecting link part established between a base station and a relay node is represented in a manner of being defined as a relay backhaul link. If transmission is performed using a DL frequency band (frequency division duplex, in case of FDD) or DL subframe (time division duplex, in case of TDD) resource, it may be represented as a backhaul downlink. If transmission is performed using a UL frequency band (in case of FDD) or UL subframe (in case of TDD) resource, it may be represented as a backhaul uplink.

On the other hand, a connection link part established between relay node and user equipment is represented in a manner of being defined as a relay access link. If transmission is performed via a relay access link using a DL frequency band (in case of FDD) or a resource of a DL subframe (in case of TDD), it may be represented as an access downlink. If transmission is performed via a relay access link using a UL frequency band (in case of FDD) or a resource of a UL subframe (in case of TDD), it may be represented as an access uplink.

A relay node (RN) may receive information from a base station in relay backhaul downlink or transmit information to the base station in relay backhaul uplink. The relay node may transmit information to a user equipment in relay access downlink or receive information from the user equipment in relay access uplink.

Meanwhile, regarding a band (or spectrum) use of a relay node, one case in which a backhaul link operates on the same frequency band of an access link may be referred to as 'in-band', and the other case in which a backhaul link operates on a frequency band different from that of an access link is referred to as 'out-band'. In both of the above-mentioned two cases of the in-band and the out-band, it is necessary for a user equipment (hereinafter, a legacy user equipment) operating in a legacy LTE system (e.g., Release-8) to access a donor cell.

Relay nodes may be classified into a transparent relay node and a non-transparent relay node by depending on whether a user equipment recognizes the relay node. In particular, the 'transparent' may mean a case that a user equipment is unable to recognize whether the user equipment is communicating with a network through a relay node. And, the 'non-transparent' may mean a case that a user equipment is able to recognize whether the user equipment is communicating with a network through a relay node.

Regarding controls of a relay node, relay nodes may be classified into one relay node configured as a part of a donor cell and another relay node capable of controlling a cell by itself.

Although the relay node configured as a part of the donor cell may have a relay node identity (ID), the relay node does not have a cell identity of its own. If at least one portion of RRM (Radio Resource Management) is controlled by a base station having the donor cell belong thereto (despite that the rest of the RPM is located at the relay node), the above-mentioned relay node may be considered as a relay node (RN) configured as a part of the donor cell. Preferably, this relay node may be able to support a legacy user equipment. For example, smart repeaters, decode-and-forward relay nodes, a variety of L2 ($2^{nd}$ layer) relay nodes, and type-2 relay nodes may belong to the category of the above-mentioned relay node.

Regarding a relay node configured to control a cell by itself, this relay node controls one or more cells, a unique physical layer cell identity is provided to each cell controlled by the relay node, and the same RRM mechanism may be usable. In aspect of a user equipment, there is no difference between accessing a cell controlled by a relay node and accessing a cell controlled by a general base station. Preferably, a cell controlled by the above-mentioned relay node may be able to support a legacy user equipment. For example, a self-backhauling RN, an L3 (3rd layer) relay node, a type-1 relay node, and a type-1a relay node may belong to the category of the above-mentioned relay node.

The type-1 relay node plays a role as an in-band relay node in controlling a plurality of cells, and a user equipment may consider each of the cells as a separate cell discriminated from a donor cell. Moreover, each of a plurality of the cells has a physical cell ID (defined in LTE Release-8) of its own and the relay node may be able to transmit a synchronization channel of its own, a reference signal and the like. In case of a single-cell operation, a user equipment may directly receive scheduling information and HARQ feedback from a relay node and may be able to transmit a control channel (scheduling request (SR), CQI, ACK/NACK, etc.) of its own to a relay node. Moreover, legacy user equipments (e.g., user equipments operating in LTE Release-8 system) may consider the type-1 relay node as a legacy base station (e.g., a base station operating in the LTE Release-8 system). In particular, the type-1 relay node has backward compatibility. Meanwhile, in aspect of user equipments operating in LTE-A system, the type-1 relay node is considered as a base station different from a legacy base station, whereby performance thereof can be enhanced.

The type-1a relay node is operated in the out-band, and has the same features as those of the type-1 relay node. Operation of the type-1a relay node may be configured to minimize (or eliminate) the influence on L1 ($1^{st}$ layer) operation.

The type-2 relay node corresponds to an in-band relay node but has no separate physical cell ID not to form a new cell. The type-2 relay node is transparent to a legacy user equipment and the legacy user equipment is unable to recognize the presence of the type-2 relay node. Although the type-2 relay node is able to transmit PDSCH, it may not transmit CRS and PDCCH at least.

Meanwhile, In order for a relay node to operate in in-band, prescribed resources in time-frequency space must be reserved for a backhaul link and these resources may be configured not be used for an access link. This configuration may be called 'resource partitioning'.

The general principles related to the resource partitioning in a relay node may be described as follows. First of all, a backhaul downlink and an access downlink may be multiplexed together on a single carrier frequency by Time Division Multiplexing (TDM) [i.e., either the backhaul downlink or the access downlink is activated in specific time.). Similarly, a backhaul uplink and an access uplink may be multiplexed together on a single carrier frequency by TDM [i.e., either the backhaul uplink or the access uplink can be activated in specific time).

Regarding the backhaul link multiplexing by FDD, a backhaul downlink transmission is performed on a downlink frequency band, and a backhaul uplink transmission is performed on an uplink frequency band. Regarding the backhaul link multiplexing by TDD, a backhaul downlink transmission is performed in a downlink subframe of a base station or a relay node, and a backhaul uplink transmission is performed in an uplink subframe of the base station or the relay node.

In case of an in-band relay node, for example, provided that both a backhaul downlink reception from a base station and an access downlink transmission to a user equipment are simultaneously performed on a prescribed frequency band, a signal transmitted from a transmitting end of a relay node may be received by a receiving end of the relay node, whereby signal interference or RF jamming may occur at an RF front-end of the relay node. Similarly, if both an access uplink reception from a user equipment and a backhaul uplink transmission to a base station are simultaneously performed on a prescribed frequency band, signal interference may occur at the RF front-end of the relay node. Therefore, it may be difficult to implement the simultaneous transmission and reception on a single frequency band at a relay node unless a sufficient separation between a received signal and a transmitted signal is provided [e.g., a transmitting antenna and a receiving antenna are installed in a manner of being sufficiently spaced apart from each other (e.g., installed on/under the ground).

As a solution for the above signal interference problem, it may be able to enable a relay node not to transmit a signal to a user equipment while receiving a signal from a donor cell. In particular, a gap is generated in a transmission from the relay node to the user equipment, and the user equipment (e.g., a legacy user equipment, etc.) may be configured not to expect any transmission from the relay node during this gap. The above-mentioned gap may be generated by constructing MBSFN (Multicast Broadcast Single Frequency Network) subframe.

Figure 10:
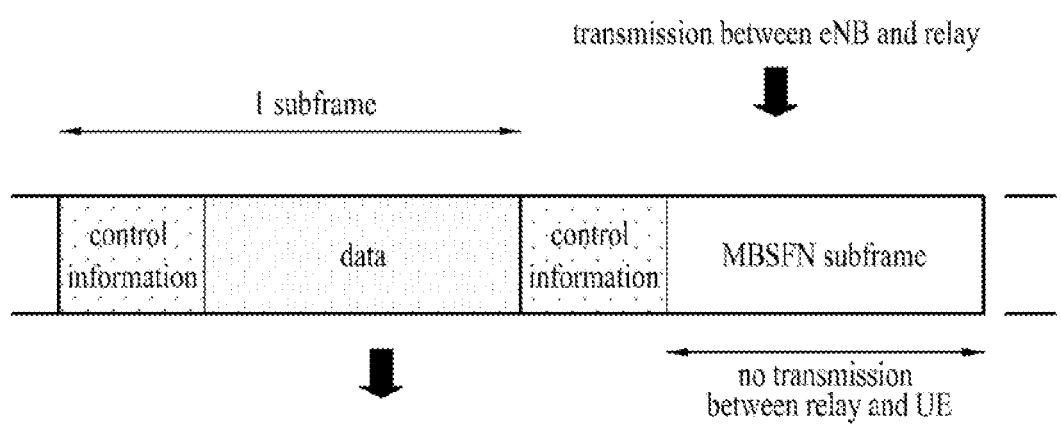
FIG. 10 is a diagram for showing an example of a relay node resource partitioning.

FIG. 10 is a diagram for showing an example of a relay node resource partitioning.

Referring to FIG. 10, a first subframe is a normal subframe and a downlink (i.e., an access down link) control signal and data are transmitted from a relay node to a user equipment. A $2^{nd}$ subframe is an MBSFN subframe. The control signal is transmitted from the relay node to the user equipment in a control region of the DL subframe. Yet, no transmission is performed from the relay node to the user equipment in the rest of the region of the DL subframe. In this case, since a legacy user equipment is configured to expect a transmission of a physical downlink control channel (PDCCH) in all DL subframes (i.e., since it is necessary for the relay node to support the legacy user equipments within the region of the relay node to perform a measuring function in a manner of receiving the PDCCH on every subframe), it is necessary to transmit the PDCCH in all DL subframes for a correct operation of the legacy user equipment. Hence, even in the subframe configured for the downlink (i.e., backhaul downlink) transmission from the base station to the relay node, it is necessary for the relay node not to receive a backhaul downlink but to perform an access downlink transmission in the first N (N is 1, 2, or 3) number of OFDM symbol interval of the subframe. Regarding this, since the PDCCH is transmitted from the relay node to the user equipment in the control region of the 2nd subframe, backward compatibility for the legacy user equipment serving in the relay node may be provided. In the rest of the region of the $2^{nd}$ subframe, the relay node may be able to receive a transmission from the base station while no transmission is performed from the relay node to the user equipment. Therefore, by using the resource partitioning, it may enable not to perform the access downlink transmission and the backhaul downlink reception at the same time in an in-band relay node.

The $2^{nd}$ subframe using an MBSFN subframe is explained in detail. A control region of the $2^{nd}$ subframe may be called a relay node non-hearing interval. The relay node non-hearing interval means an interval for the relay node to transmit an access downlink signal without receiving a backhaul downlink signal. This interval can be configured by the length of 1, 2, or 3 OFDMs. The relay node performs an access downlink transmission to a user equipment in the relay node non-hearing interval and may be able to receive a backhaul downlink from a base station in the rest of the region. At this time, since the relay node is unable to perform a transmission and reception at the same time on an identical frequency band, it takes time for the relay node to change from a transmitting mode to a receiving mode. Thus, it is necessary to configure a guard time (GT) in order for the relay node to switch from the receiving mode to the transmitting mode in a first prescribed part of the interval of the backhaul downlink receiving region. Similarly, in case that the relay node operates to receive the backhaul link from the base station and to transmit the access downlink to the user equipment, it may be able to configure the guard time (GT) in order for the relay node to switch from the receiving mode to the transmitting mode. The length of the guard time may be given by the value of the time domain. For instance, it may be given by the value of k (k≥1) number of time sample (Ts) or may be configured by the length of one or more OFDM symbols. Or, the guard time of the last part of the subframe may not be defined or configured in case that the relay node backhaul downlink subframe is configured consecutively or according to a prescribed subframe timing alignment relationship. In order to maintain a backward compatibility, the guard time can be defined on the frequency domain configured for the backhaul downlink subframe transmission only (if the guard time is configured in the access downlink interval, a legacy user equipment may not be supported). The relay node may be able to receive PDCCH and PDSCH in the backhaul downlink receiving interval except the guard time. This may be represented as an R-PDCCH (relay-PDCCH) and an R-PDSCH (relay-PDSCH) in a meaning of a relay node dedicated physical channel.

In LTE-A system, a study for an eICIC (enhanced inter cell interference coordination) to reduce an interference between a $1^{st}$ base station (eNB1) and a $2^{nd}$ base station (eNB2) in a heterogeneous network (HetNet) is in progress. A main focus of the study is an ABS (almost blank subframe). A subframe designated as the ABS is configured to transmit a CRS only.

A cell configuration considered in the LTE-A system may include macro cell vs. femto cell, macro cell vs. pico cell and the like. It is assumed that information exchange via an X2 interface, which is an inter-cell interface, does not exist in the configuration of macro cell vs. femto cell and the information exchange via the X2 interface is available in the configuration of macro cell vs. pico cell. The present invention includes a content of an inter-cell subframe arrangement (subframe coordination) when the inter-cell information exchange is available like the configuration of macro cell vs. pico cell. The case of macro cell vs. pico cell is explained as an example in the present invention. Yet, the present invention may be applied to all of the cases that the inter-cell subframe arrangement is needed.

Figure 11:
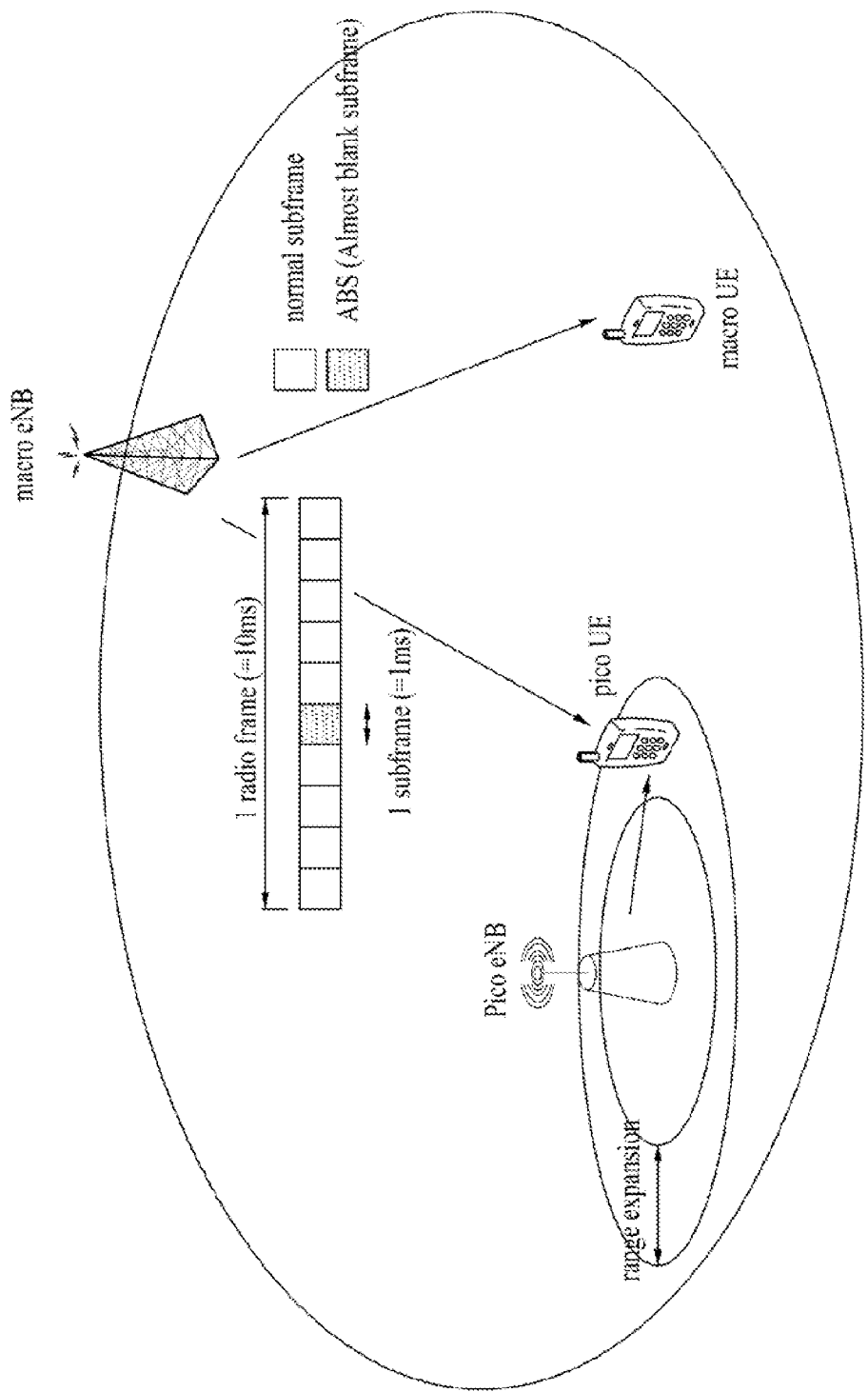
FIG. 11 is a diagram for showing an ABS application example in case of a macro cell vs. a pico cell.

FIG. 11 is a diagram for showing an ABS application example in case of macro cell vs. a pico cell.

Referring to FIG. 11, a range expansion of a pico cell means that a coverage of the pico cell is expanded using a transmit power offset and the like. In particular, assume that a pico UE exists in the region of the expanded range in FIG. 11. In this case, since a signal from an eNB of the pico cell becomes weaker and interference from the macro cell become stronger, a reception performance from the pico cell decreases due to the interference of an eNB of the macro cell.

Hence, at least one subframe of the subframes transmitted by the eNB of the macro cell are designated as an ABS and data is not transmitted except the CRS. The eNB of the pico cell may be able to allocate the corresponding subframe designated as the ABS to the pico UE, which exists in the region of the expanded range as shown in FIG. 11.

In case that the eICIC is performed using the ABS or the ABS, which is MBSFN as shown in FIG. 11, the present invention proposes a method of configuring a subframe setting between a plurality of cells requiring a subframe arrangement. In the following description, a FDD system is explained in a manner of assumption for clarity, it is apparent that the method may be applied to a TDD system as well by those having ordinary skill in the technical field to which the present invention pertains.

In case of a subframe arrangement, considerations are as follows.

A PBCH is transmitted in a subframe index 0, PSS and SSS are transmitted in the subframe index 0 and the subframe 5, respectively. It is possible to transmit a paging in one of the subframe index 0, 4, 5, and 9. In particular, since the PBCH, the PSS, the SSS, and the paging are transmitted by 10 ms unit, it should preferentially consider a scheduling of 10 ms unit. And, in case that an interfered cell intends to protect a corresponding subframe, an interfering cell may be able to designate the corresponding cell as an ABS.

And, a HARQ process is determined according to the subframes configured for a transmission between a base station and a user equipment. For instance, regarding a FDD frame structure (frame structure type 1), the HARQ process can be determined by an 8-bit bitmap of a parameter subframe configuration FDD. In particular, the interval of the hybrid ARQ (HARQ) is 8 ms. Meanwhile, if it fails to decode PHICH for delivering ACK/NACK for PUSCH transmission from a pico UE to a pico cell, it may cause an error in transmitting the PUSCH, a resource collision with a different UE, or the like. Therefore, in order to protect the PHICH transmission from the pico cell to the pico UE, it is necessary to schedule in consideration of the HARQ of 8 ms-unit.

In case of configuring a subframe arrangement in consideration of the above mentioned, the present invention proposes that a subframe arrangement information signaled by an eNB of the macro cell (interfering cell) to the eNB of the pico cell (interfered cell) needs to be configured as follows.

1st Embodiment

A 1st embodiment of the present invention suggests that a subframe arrangement information is configured in a bit-mapped manner using 10 bits for indicating a scheduling of 10 ms-unit and 8 bits for indicating a scheduling of 8 ms-unit, i.e., using 18 bits. In this case, a 10 bits group and an 8 bits group can be mapped to an actual subframe via a logical OR calculation.

Another method of configuring the subframe arrangement information in a bitmapped manner may include a bitmap pattern of 40 bits-unit, which is a least common multiple of the 10 bits and 8 bits. Yet, this method has a drawback in requiring 22 bits more than the aforementioned 18 bits configuration information. If such a subframe pattern as a subframe pattern of 20 ms-unit exists additionally, it may be able to represent in a manner of combining the bitmap pattern of 40 bits-unit in the above and the subframe pattern of 20 ms-unit.

Figure 12:
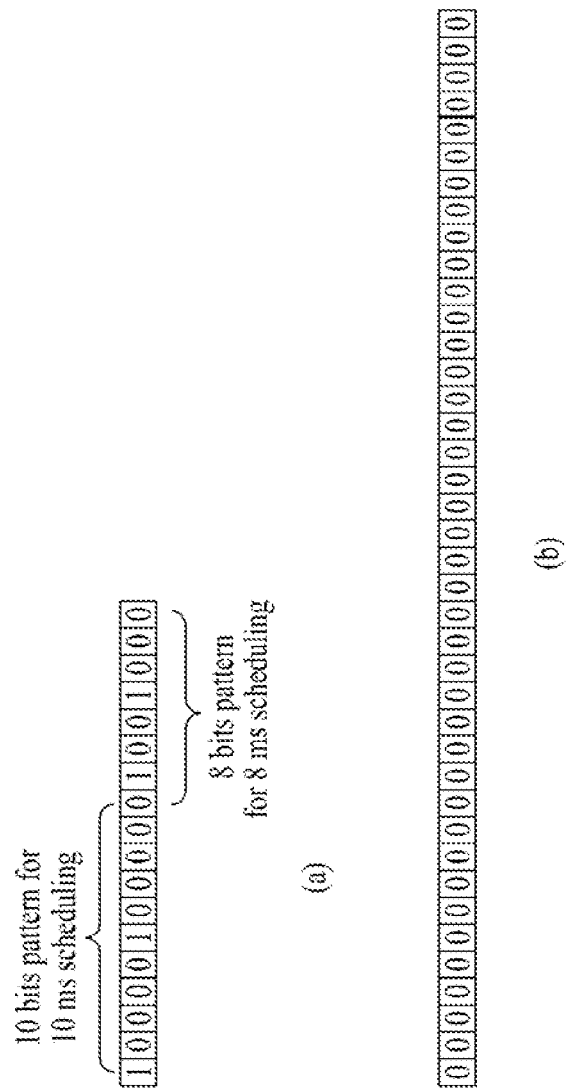
FIG. 12 is a diagram for showing one example of subframe arrangement information according to a $1^{st}$ embodiment of the present invention.

FIG. 12 is a diagram for showing one example of subframe arrangement information according to the $1^{st}$ embodiment of the present invention.

Referring to FIG. 12, a bit value '1' means that an interfering cell transmits an ABS and the bit value '0' means that the interfering cell transmits a normal subframe. For instance, if the 1st embodiment of the present invention is used, it protects PBCH and PSS/SSS of a pico cell, which is an interfered cell. A subframe arrangement information to maintain a transmission of HARQ process index 1 and 4 can be represented as shown in FIG. 12($a$).

Thus, in case of comparing FIG. 12($a$) with FIG. 12($b$) indicating same subframe arrangement information, it may be able to know that FIG. 12($a$) according to the 1st embodiment of the present invention may be able to reduce a signaling overhead of 22 bits.

Consequently, the eNB of the pico cell receives the subframe arrangement information shown in the FIG. 12($b$) in a manner of receiving and interpreting the information disclosed in the FIG. 12($a$) and may be able to allocate the subframe having a bit value '1' to the pico UE situated at the region of the expanded range.

If there exists a subframe, which should be transmitted by the macro cell to reduce a signaling overhead, the present invention additionally suggests that the corresponding subframe should be considered. In particular, it is preferable to make the interfered cell know the subframe routinely (or until the next signaling) transmitted by the interfering cell via a pre-defined signaling between the interfering cell and the interfered cell. It is explained with reference to the drawing.

Figure 13:
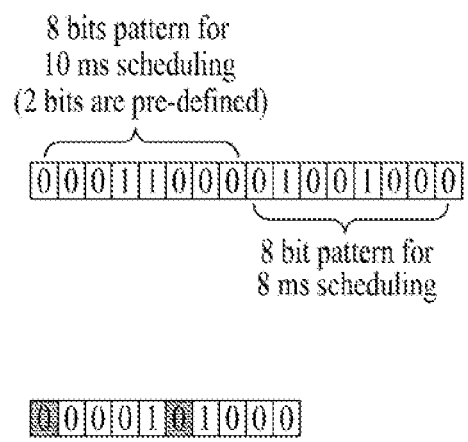
FIG. 13 is another diagram for showing one example of subframe arrangement information according to a $1^{st}$ embodiment of the present invention.

FIG. 13 is another diagram for one example of subframe arrangement information according to a $1^{st}$ embodiment of the present invention. In particular, in FIG. 13, assume that both of the interfering cell and the interfered cell recognize a fact that the interfering cell always transmits a normal subframe in subframe index 0 and 5 via a separate signaling.

Referring to FIG. 13, it is able to know that the 10 bits group of FIG. 12 is set to the 8 bits group, which is excluded 2 bits. It may be able to interpret that the 8 bits group '00011000' means the 10 bits group '0000101000'. If the subframe arrangement information is configured as shown in FIG. 13, the subframe arrangement information can be configured using only 16 bits.

2nd Embodiment

In the 2nd embodiment of the present invention, another method of configuring a subframe arrangement information is proposed. The aforementioned 1st embodiment has a merit in terms of a signaling flexibility since it is able to represent all cases. Yet, it has a drawback in that an overhead may become greater. In order to supplement the drawback, the 2nd embodiment of the present invention suggests that a pattern index is signaled in a manner of defining a limited number of subframe patterns. In this case, each subframe pattern can be represented by 40 ms-unit.

The subframe pattern may be designated as a pattern for protecting PBCH, which is common information, PSS/SSS, and a paging and the like, the pattern for protecting each HARQ process, the pattern for protecting a combination of the common information and the HARQ process and the like.

In case of configuring a subframe pattern, it is preferable that a subframe index is configured with a point of view of a pico cell, which is an interfered cell. In particular, a pattern is not signaled based on the subframe index of the interfering cell but the subframe index is configured with the point of view of the pico cell, which is the interfered cell.

Figure 14:
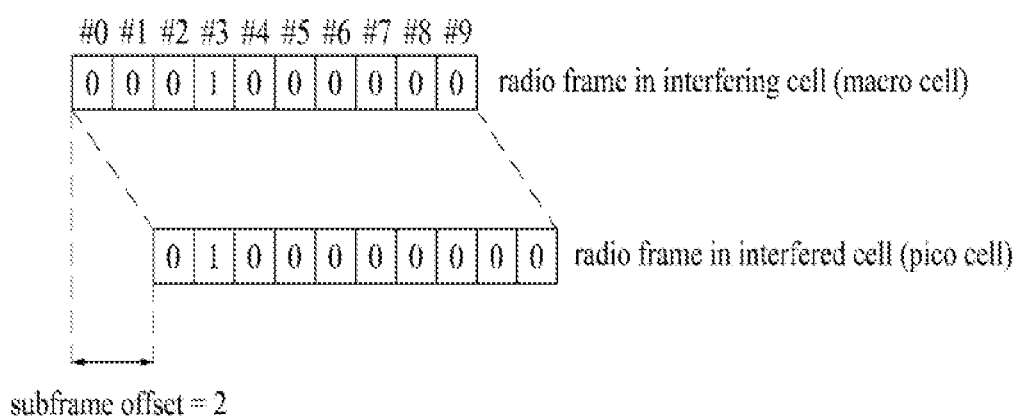
FIG. 14 is a diagram for showing one example of configuring a subframe pattern according to a $2^{nd}$ embodiment of the present invention.

FIG. 14 is a diagram for showing one example of configuring a subframe pattern according to a $2^{nd}$ embodiment of the present invention. In particular, in FIG. 14, assume that a subframe offset between an interfering cell and an interfered cell is 2.

Referring to FIG. 14, in case that the interfering cell intends to designate a second subframe (i.e., subframe index 1) of the interfered cell as ABS, an available bitmap can be represented as '0001000000' according to the subframe index of the interfering cell. Yet, the 2nd embodiment of the present invention may be able to represent it as '0100000000' according to the subframe index of the interfered cell.

In case of configuring a subframe index with the point of view of the macro cell, which is an interfering cell, the number of pattern to be defined may increase to the maximum of 10 times more than the number of pattern to be defined in case of configuring a subframe index with the point of view of the pico cell. It is explained with reference to the drawing.

FIG. 15 is another diagram for showing one example of configuring a subframe pattern according to a $2^{nd}$ embodiment of the present invention. In particular, FIG. 15 indicates an example that an interfered cell protects PBCH only and a subframe pattern is defined by 10 ms-unit for clarity.

Referring to FIG. 15, in case of configuring a subframe pattern with a point of view of an interfering cell, a total of 10 patterns should be defined according to an inter-cell subframe offset. Yet, according to the 2nd embodiment of the present invention, it is enabled by the pattern of the case that the subframe offset value is 0 only.

Since the inter-cell subframe offset value should be known to the interfering cell and the interfered cell in advance in order to apply the 2nd embodiment of the present invention, the present invention additionally suggests that the inter-cell subframe offset value between the interfering cell and the interfered cell is signaled separately.

Figure 16:
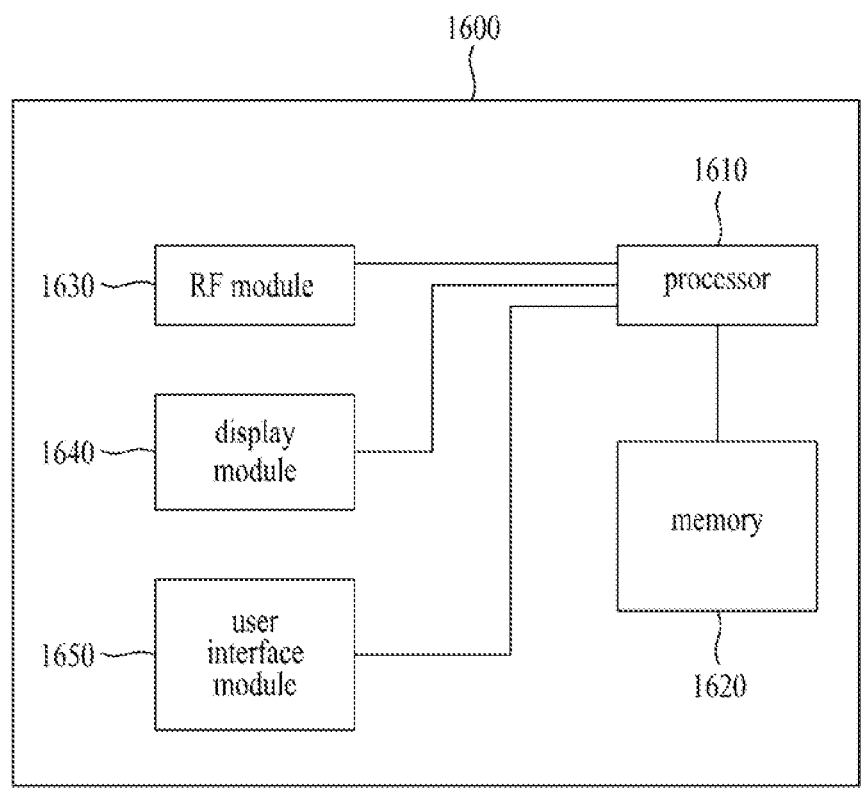
FIG. 16 is a block diagram for showing a configuration of a wireless communication device according to one embodiment of the present invention.

FIG. 16 is a block diagram for a configuration of a wireless communication device according to one embodiment of the present invention.

Referring to FIG. 16, a communication device 1600 may include a processor 1610, a memory 1620, an RF module 1630, a display module 1640, and a user interface module 1650.

Since the communication device 1600 is depicted for clarity of description, prescribed module(s) may be omitted in part. The communication device 1600 may further include necessary module(s). And, a prescribed module of the communication device 1600 may be divided into subdivided modules. A processor 1610 is configured to perform an operation according to the embodiments of the present invention illustrated with reference to drawings. In particular, the detailed operation of the processor 1610 may refer to the former contents described with reference to FIG. 1 to FIG. 15.

The memory 1620 is connected with the processor 1610 and stores an operating system, applications, program codes, data, and the like. The RF module 1630 is connected with the processor 1610 and then performs a function of converting a baseband signal to a radio signal or a function of converting a radio signal to a baseband signal. To this end, the RF module 1630 performs an analog conversion, amplification, a filtering, and a frequency up conversion, or performs processes inverse to the former processes. The display module 1640 is connected with the processor 1610 and displays various kinds of informations. And, the display unit 1640 can be implemented using such a well-known component as an LCD (liquid crystal display), an LED (light emitting diode), an OLED (organic light emitting diode) display and the like, by which the present invention may be non-limited. The user interface module 1650 is connected with the processor 1610 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this specification, embodiments of the present invention are described centering on the data transmission/reception relations between a relay node and a base station. In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other network nodes except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of preventing an inter-cell interference in a heterogeneous network system and apparatus therefor are described with reference to examples applied to 3GPP LTE system, it may be applicable to various kinds of wireless communication systems as well as to the 3GPP LTE system.

What is claimed is:

1. A method of configuring a subframe arrangement, which is configured by an interfered cell in a wireless communication system, comprising the steps of:
   receiving a subframe arrangement information including a first bitmap for defining a subframe pattern for the interfered cell and a second bitmap for defining a hybrid automatic repeat and request (HARQ) process pattern of the interfered cell from an interfering cell;
   configuring the subframe arrangement of the interfered cell based on the first bitmap and the second bitmap; and
   performing a scheduling for a user equipment belonging to the interfered cell using the configured subframe arrangement,
   wherein a downlink signal of the interfering cell is not transmitted in one or more subframes designated by the subframe pattern for the interfered cell and wherein a size of the second bitmap is 8 bits.

2. The method of claim 1, the subframe arrangement of the interfered cell configuring step, comprising the steps of:
   repeating each of the first bitmap and the second bitmap with a size of a least common multiple of the size of the first bitmap and the second bitmap; and
   generating the subframe arrangement of the interfered cell by performing an OR calculation by a bitwise on the repeated first bitmap and the repeated second bitmap.

3. The method of claim 1, further comprising the step of receiving an interfering cell-specific subframe information from the interfering cell,
   wherein the subframes defined by the first bitmap excludes one or more subframes designated by the interfering cell-specific subframe information.

4. The method of claim 3, the subframe arrangement of the interfered cell configuring step, comprising the steps of:
   configuring a third bitmap by adding one or more subframe informations designated by the interfering cell-specific subframe information to the first bitmap;
   repeating each of the second bitmap and the third bitmap with a size of a least common multiple of the size of the second bitmap and the third bitmap; and
   generating the subframe arrangement of the interfered cell by performing an OR calculation by a bitwise on the repeated second bitmap and the repeated third bitmap.

5. The method of claim 1, wherein the size of the first bitmap is 10 bits.

6. The method of claim 4, wherein the size of the third bitmap is 10 bits.

7. The method of claim 1, wherein the subframe arrangement information is received via an X2 interface.

8. The method of claim 1, wherein the downlink signal is transmitted to the user equipment belonging to the interfered cell in one or more subframes designated by the subframe arrangement.

9. The method of claim 1, wherein the interfered cell comprises a pico cell and wherein the user equipment belonging to the interfered cell is situated at a region of an expanded range of the pico cell.

10. A base station device in a wireless communication system, comprising:
    a receiving module configured to receive a subframe arrangement information including a first bitmap for defining a subframe pattern for the base station device and a second bitmap for defining a hybrid automatic repeat and request (HARQ) process pattern of the base station device from an adjacent base station;
    a processor configured to configure a subframe arrangement of an interfered cell based on the first bitmap and the second bitmap; and
    a transmitting module configured to transmit a downlink signal to a user equipment belonging to the base station device in one or more subframes designated by the subframe arrangement,
    wherein a downlink signal of the adjacent base station is not transmitted in one or more subframes designated by the subframe pattern for the base station device and wherein a size of the second bitmap is 8 bits.

11. The base station device of claim 10, wherein the processor repeats each of the first bitmap and the second bitmap with a size of a least common multiple of the size of the first bitmap and the second bitmap and wherein the processor generates the subframe arrangement of the base station device by performing an OR calculation by a bitwise on the repeated first bitmap and the repeated second bitmap.

12. The base station device of claim 10, wherein the receiving module further receives an adjacent base station-specific subframe information from the adjacent base station and wherein the subframes defined by the first bitmap excludes one or more subframes designated by the adjacent base station-specific subframe information.

13. The base station device of claim 12, wherein the processor configures a third bitmap by adding one or more subframe informations designated by the adjacent base station-specific subframe information to the first bitmap, wherein the processor repeats each of the second bitmap and the third bitmap with a size of a least common multiple of the size of the second bitmap and the third bitmap, and wherein the processor generates the subframe arrangement of the base station device by performing an OR calculation by a bitwise on the repeated second bitmap and the repeated third bitmap.

14. The base station device of claim 10, wherein the size of the first bitmap is 10 bits.

15. The base station device of claim 13, wherein the size of the third bitmap is 10 bits.

* * * * *